United States Patent
Niwa et al.

(10) Patent No.: US 12,438,184 B2
(45) Date of Patent: Oct. 7, 2025

(54) CERAMIC POWDER, SINTERED BODY AND BATTERY

(71) Applicant: DAIICHI KIGENSO KAGAKU KOGYO CO., LTD., Osaka (JP)

(72) Inventors: Tadahiro Niwa, Osaka (JP); Sadahiro Yagishita, Osaka (JP)

(73) Assignee: DAIICHI KIGENSO KAGAKU KOGYO CO., LTD., Osaka (JP)

( * ) Notice: Subject to any disclaimer, the term of this patent is extended or adjusted under 35 U.S.C. 154(b) by 1183 days.

(21) Appl. No.: 17/041,558

(22) PCT Filed: Mar. 26, 2019

(86) PCT No.: PCT/JP2019/013036
§ 371 (c)(1),
(2) Date: Sep. 25, 2020

(87) PCT Pub. No.: WO2019/189275
PCT Pub. Date: Oct. 3, 2019

(65) Prior Publication Data
US 2021/0119251 A1  Apr. 22, 2021

(30) Foreign Application Priority Data

Mar. 27, 2018  (JP) ................... 2018-059729
Mar. 27, 2018  (JP) ................... 2018-059734

(51) Int. Cl.
*H01M 10/0562* (2010.01)
*C01G 25/00* (2006.01)
(Continued)

(52) U.S. Cl.
CPC ...... *H01M 10/0562* (2013.01); *C01G 25/006* (2013.01); *C04B 35/48* (2013.01);
(Continued)

(58) Field of Classification Search
None
See application file for complete search history.

(56) References Cited

U.S. PATENT DOCUMENTS

2012/0251882 A1  10/2012  Moon et al.
2015/0056519 A1   2/2015  Ohta et al.
(Continued)

FOREIGN PATENT DOCUMENTS

JP  2015-041573  3/2015
JP  2015-088423  5/2015
(Continued)

OTHER PUBLICATIONS

Bernuy-Lopez, Carlos, et al. "Atmosphere Controlled Processing of Ga-Substituted Garnets for High Li-Ion Conductivity Ceramics." Chemistry of Materials, vol. 26, No. 12, Jun. 4, 2014, pp. 3610-3617, https://doi.org/10.1021/cm5008069. (Year: 2014).*

(Continued)

*Primary Examiner* — Robert S Carrico
(74) *Attorney, Agent, or Firm* — Sheridan Ross P.C.

(57) ABSTRACT

This invention provides a ceramic powder capable of forming a sintered body having a high density and high ionic conductivity even at a sintering temperature lower than the temperature conventionally used, and provides a battery containing a sintered body of the ceramic powder as a constituent element. The above problem is solved by a ceramic powder containing a garnet-type oxide and compound 1, wherein the garnet-type oxide contains zirconium, lithium, and lanthanum, and compound 1 contains at least one metal element selected from the group consisting of lanthanum, lithium, zirconium, gallium, scandium, yttrium, cerium, aluminum, calcium, magnesium, barium, strontium, niobium, and tantalum.

8 Claims, 6 Drawing Sheets

(51) Int. Cl.
  *C04B 35/48* (2006.01)
  *C04B 35/488* (2006.01)
  *C04B 35/50* (2006.01)
  *H01B 1/08* (2006.01)

(52) U.S. Cl.
  CPC ............ *C04B 35/488* (2013.01); *C04B 35/50* (2013.01); *H01B 1/08* (2013.01); *C01P 2002/72* (2013.01); *C01P 2002/74* (2013.01); *C01P 2002/76* (2013.01); *C04B 2235/3203* (2013.01); *C04B 2235/3227* (2013.01); *C04B 2235/3244* (2013.01); *C04B 2235/3286* (2013.01); *C04B 2235/443* (2013.01); *C04B 2235/764* (2013.01); *C04B 2235/80* (2013.01); *C04B 2235/9615* (2013.01); *H01M 2300/0071* (2013.01)

(56) References Cited

U.S. PATENT DOCUMENTS

| | | | |
|---|---|---|---|
| 2016/0268628 | A1 | 9/2016 | Masuko et al. |
| 2016/0293947 | A1 | 10/2016 | Tamura et al. |
| 2016/0308244 | A1 | 10/2016 | Badding et al. |
| 2018/0062200 | A1 | 3/2018 | Yamamoto et al. |
| 2018/0175446 | A1 | 6/2018 | Nishizaki et al. |
| 2021/0194045 | A1* | 6/2021 | Beck .................. H01M 10/0525 |

FOREIGN PATENT DOCUMENTS

| | | |
|---|---|---|
| JP | 2016-169142 | 9/2016 |
| JP | 2016-535391 | 11/2016 |
| JP | 2017-033926 | 2/2017 |
| JP | 2018-037325 | 3/2018 |
| WO | WO 2015/054320 | 4/2015 |
| WO | WO 2018/236394 | 12/2018 |

OTHER PUBLICATIONS

Extended Search Report for European Patent Application No. 19777281.7, dated Nov. 22, 2021, 12 pages.
Buannic et al. "Dual Substitution Strategy to Enhance Li Ionic Conductivity in Li7La3Zr2O12 Solid Electrolyte," Chemistry of Materials, 2017, vol. 29, pp. 1769-1778.
Kihira et al. "Effect of Simultaneous Substitution of Alkali Earth Metals and Nb in Li7La3Zr2O12 on Lithium-Ion Conductivity," ECS Electrochemistry Letters, 2013, vol. 2, No. 7, pp. A56-A59.
Rangasamy et al. "The effect of 24c-site (A) cation substitution on the tetragonal-cubic phase transition in Li7—xLa3—xAxZr2O12 garnet-based ceramic electrolyte," Journal of Power Sources, 2013, vol. 230, pp. 261-266.
Rosero-Navarro et al. "Effect of sintering additives on relative density and Li-ion conductivity of Nb-doped Li7La3Zr2O12 solid electrolyte," Journal of the American Ceramic Society, Jan. 2017, vol. 100, No. 1, pp. 276-285.
Wagner et al. "Crystal Structure of Garnet-Related Li-Ion Conductor Li7—3xGaxLa3Zr2O12: Fast Li-Ion Conduction Caused by a Different Cubic Modification?" Chemistry of Materials, Feb. 2016, vol. 28, pp. 1861-1871.
Xu et al. "Multistep sintering to synthesize fast lithium garnets," Journal of Power Sources, Jan. 2016, vol. 302, pp. 291-297.
International Search Report and Written Opinion for International (PCT) Patent Application No. PT/JP2019/013036, dated May 21, 2019, 10 pages.
English Translation of the International Search Report for International (PCT) Patent Application No. PCT/JP2019/013036, dated May 21, 2019, 2 pages.

* cited by examiner

CERAMIC POWDER, SINTERED BODY AND BATTERY

CROSS REFERENCE TO RELATED APPLICATIONS

This application is a national stage application under 35 U.S.C. 371 and claims the benefit of PCT Application No. PCT/JP2019/013036 having an international filing date of 26 Mar. 2019, which designated the United States, and which PCT application claimed the benefit of Japan Patent Application No. 2018-059729 filed 27 Mar. 2018, and Japan Patent Application No. 2018-059734 filed 27 Mar. 2018, the contents of each of which are incorporated herein by reference in their entireties.

TECHNICAL FIELD

The present invention relates to a ceramic powder, a sintered body, and a battery.

BACKGROUND ART

Garnet is known as a cubic silicate mineral represented by the chemical composition $M^{2+}_3M^{3+}_2Si_3O_{12}$ (wherein $M^{2+}$ is Mg, Ca, Mn, or Fe, and $M^{3+}$ is Al, Cr, or Fe). Garnet-type compounds having crystal structures similar to the structure of garnet are not limited to silicates, and all of the $M^{2+}$, $M^{3+}$, $Si^{4+}$ ion positions in the crystal structure are replaceable with ions of various valencies. Accordingly, there are various garnet-type compounds having a crystal structure similar to that of garnet. Among chemically synthesized garnet-type compounds, some are widely used in industry.

The garnet-type compound $Li_7La_3Zr_2O_{12}$ (hereinafter abbreviated as "LLZ"), which is suitable as a solid electrolyte material for an all-solid lithium-ion battery having remarkable lithium ion conductivity, is a material that has recently been attracting attention.

In recent years, garnet-type compounds in which various elements are doped in LLZ have been proposed (see, for example, Patent Literature (PTL) 1 and PTL 2).

CITATION LIST

Patent Literature

PTL 1: JP2017-033926A
PTL 2: JP2015-041573A

SUMMARY OF INVENTION

Technical Problem

However, conventional garnet-type compounds must be subjected to heat treatment at a temperature exceeding 1100° C., for example, to obtain sintered bodies, which causes problems such that lithium volatilization is likely to occur, and such that decomposition is likely to occur. Therefore, sintered bodies of the LLZ-based garnet-type compounds did not have particularly high ionic conductivity or strength.

The present invention has been made in view of the above. An object of the present invention is to provide a ceramic powder, a sintered body of the ceramic powder, and a battery comprising the sintered body of the ceramic powder as a constituent element; the ceramic powder being capable of forming a sintered body having a high density and high ionic conductivity, even at a sintering temperature lower than the temperature conventionally used.

Solution to Problem

To achieve the above object, the present inventors repeated extensive research, and found that the object can be achieved by combining a garnet-type oxide containing lithium, lanthanum, and zirconium with compound 1 containing a specific type of element. The present invention has thus been completed.

More specifically, the present invention encompasses, for example, the subject matter shown in the following Items.

Item 1. A ceramic powder containing a garnet-type oxide and compound 1,
wherein the garnet-type oxide contains zirconium, lithium, and lanthanum, and compound 1 contains at least one metal element selected from the group consisting of lanthanum, lithium, zirconium, gallium, scandium, yttrium, cerium, aluminum, calcium, magnesium, barium, strontium, niobium, and tantalum.

Item 2. The ceramic powder according to Item 1, wherein the garnet-type oxide further contains at least one element selected from the group consisting of gallium, yttrium, cerium, calcium, barium, strontium, niobium, and tantalum.

Item 3. The ceramic powder according to Item 1 or 2, wherein the garnet-type oxide contains a compound represented by a composition formula: $Li_{7-3x}Ga_xLa_3Zr_2O_{12}$, wherein $0.15 \leq x \leq 0.35$.

Item 4. The ceramic powder according to any one of Items 1 to 3, wherein compound 1 contains lanthanum, and does not contain zirconium, scandium, yttrium, cerium, aluminum, calcium, magnesium, barium, strontium, niobium, or tantalum.

Item 5. The ceramic powder according to any one of Items 1 to 4, wherein compound 1 is an oxide.

Item 6. The ceramic powder according to any one of Items 1 to 5, wherein compound 1 is lanthanum oxide.

Item 7. The ceramic powder according to any one of Items 1 to 6, further containing compound 2 containing lithium and having a melting point of 250° C. or higher and 1000° C. or lower.

Item 8. The ceramic powder according to Item 7, wherein compound 2 contains lithium gallate.

Item 9. The ceramic powder according to any one of Items 1 to 8, further containing compound 3 containing lanthanum and zirconium and not containing lithium or gallium.

Item 10. The ceramic powder according to Item 9, wherein compound 3 is lanthanum zirconate.

Item 11. The ceramic powder according to any one of Items 1 to 10, wherein a value of $I_b/I_a$ of maximum peak intensity $I_b$ in the range of $2\theta=29.7$ to $30°$ to maximum peak intensity $I_a$ in the range of $2\theta=16$ to $17°$ is 0.02 or more and 0.2 or less in X-ray diffraction measurement.

Item 12. The ceramic powder according to any one of Items 1 to 11, wherein a value of the molar ratio La/Zr of lanthanum to zirconium is more than 1.5 and 1.6 or less, and a value of the molar ratio Ga/Zr of gallium to zirconium is 0.075 or more and 0.18 or less.

Item 13. The ceramic powder according to any one of Items 1 to 12, wherein heat treatment of a molded body under conditions at a rate of 5° C./minute to 800° C. and then at a rate of 1° C./minute from 800 to 950° C. causes the molded body to start to undergo volumetric shrinkage at 800° C. or higher, and wherein the molded body after the heat treatment has a heating dimensional change rate of 5% or more.

Item 14. The ceramic powder according to any one of Items 1 to 13, wherein lithium lanthanum gallate is generated by heat treatment at 900° C. or higher.

Item 15. A sintered body of the ceramic powder of any one of Items 1 to 14, the sintered body containing the garnet-type oxide, a first oxide, and a second oxide, wherein the first oxide contains at least one metal element selected from the group consisting of lanthanum, lithium, zirconium, gallium, scandium, yttrium, cerium, aluminum, calcium, magnesium, barium, strontium, niobium, and tantalum, and the second oxide contains lithium and gallium, and does not contain lanthanum.

Item 15'. A sintered body of the ceramic powder of any one of Items 1 to 14.

Item 16. The sintered body according to Item 15, containing a main phase and at least one first phase other than the main phase, wherein the main phase is composed of the garnet-type oxide, and the first phase has a composition and/or crystal system different from that of the main phase, and is composed of the first oxide.

Item 17. The sintered body according to Item 16, further containing at least one second phase, wherein the second phase has a composition and/or crystal system different from that of the main phase or the first phase, and is composed of the second oxide.

Item 18. The sintered body according to any one of Items 15 to 17, wherein the first oxide is lithium lanthanum gallate.

Item 19. The sintered body according to any one of Items 15 to 18, wherein the second oxide is lithium gallate.

Item 20. The sintered body according to any one of Items 15 to 19, wherein the ratio $I_c/I_a$ of maximum peak intensity $I_c$ in the range of $2\theta=22.7$ to $23.4°$ to maximum peak intensity $I_a$ in the range of $2\theta=16$ to $17°$ is 0.012 or more and 0.06 or less in X-ray diffraction measurement.

Item 21. The sintered body according to any one of Items 15 to 20, wherein a value of the molar ratio La/Zr of lanthanum to zirconium is more than 1.5 and 1.6 or less, and a value of the molar ratio Ga/Zr of gallium to zirconium is 0.075 or more and 0.18 or less.

Item 22. The sintered body according to any one of Items 15 to 21, having a lithium ion conductivity of $2 \times 10^{-4}$ S/cm or more, the lithium ion conductivity being determined based on a total resistance value.

Item 23. The sintered body according to any one of Items 15 to 22, having a density of 4.5 to 5.1 g/cm$^3$.

Item 24. The sintered body according to any one of Items 15 to 23, having an activation energy for lithium ion conduction of 18 to 28 kJ/mol.

Item 25. A battery comprising the sintered body of any one of Items 15 to 24.

Item 25'. A battery comprising the sintered body of the ceramic powder of Item 15'.

Advantageous Effects of Invention

The ceramic powder according to the present invention is capable of forming a sintered body having a high density and high ionic conductivity, even at a sintering temperature lower than the temperature conventionally used. Therefore, the sintered body formed by using the ceramic powder of the present invention can be suitably used for batteries; in particular, for all-solid lithium-ion secondary batteries etc.

DESCRIPTION OF EMBODIMENTS

1. Ceramic Powder

The ceramic powder contains a garnet-type oxide containing specific elements, and compound 1 containing at least one specific element.

The ceramic powder, even when sintered at a low temperature, is capable of providing a sintered body having a high density and high ionic conductivity. In the present specification, the phrase "sintering at a low temperature" may include the meaning of, for example, sintering at 600° C. or higher and 1000° C. or lower.

The garnet-type oxide contains zirconium, lithium, and lanthanum. The garnet-type oxide is preferably a composite oxide containing zirconium, lithium, and lanthanum as constituent elements. For example, the garnet-type oxide can form a solid solution.

The garnet-type oxide preferably further contains at least one element selected from the group consisting of gallium, yttrium, cerium, calcium, barium, strontium, niobium, and tantalum. In this case, the ceramic powder has further improved sinterability; thus, sintering at a low temperature is more easily achieved, the density of the sintered body is further increased, and the ionic conductivity of the sintered body is easily increased. The garnet-type oxide more preferably does not contain aluminum, magnesium, zinc, or scandium.

Zirconium compounds can usually contain a small amount of hafnium as an unavoidable component. Therefore, compounds that contain zirconium may unavoidably contain hafnium at a molar ratio of hafnium to zirconium (number of moles of Hf/number of moles of Zr) of 0.01 to 0.05. In the produced garnet-type compound, the hafnium component is not observed as an impurity compound; instead, it is assumed that the hafnium component is present at the zirconium position in the crystal structure. Therefore, in this specification, the Zr concentration represents the sum of the zirconium concentration and hafnium concentration, unless otherwise specified. Further, "Zr" in composition ratios refers to the sum of zirconium and hafnium (this also applies to "Zr" in Hf/Zr mentioned above). Hafnium is preferably not present in the form of an oxide or a salt. The absence of these elements in the form of an oxide or a salt can be confirmed by XRD spectrum.

The garnet-type oxide can contain, for example, a compound represented by the composition formula: $Li_{7-3x}Ga_xLa_3Zr_2O_{12}$ (wherein $0.15 \leq x \leq 0.35$). The garnet-type oxide may consist of only a compound represented by the composition formula: $Li_{7-3x}Ga_xLa_3Zr_2O_{12}$ (wherein $0.15 \leq x \leq 0.35$).

The garnet-type oxide has a garnet-type crystal structure. The garnet-type structure usually has a cubic crystal system, and has a crystal structure that is classified into the space group Ia-3d, which means that the crystal structure is analogous to the structure of garnet ore.

The garnet-type structure not only refers to the crystal structures strictly meeting the above conditions, but also includes its analogous structures. Specific examples of such garnet-type structures include crystal structures having a tetragonal crystal system, such as the space group $I4_1/acd$.

Whether the garnet-type oxide has a garnet-type structure can be determined by X-ray diffraction (XRD) measurement. Specifically, when a garnet-type oxide has a garnet-type structure, a diffraction pattern analogous to 045-0109 ($Li_5La_3Nb_2O_{12}$, cubic crystal system, space group Ia-3d) of the ICDD powder diffraction file is observed in its XRD pattern.

The garnet-type oxide preferably contains crystals classified into a cubic crystal system, such as space group Ia-3d, and preferably does not contain crystals classified into a tetragonal crystal system, such as space group $I4_1/acd$. A ceramic powder containing such a garnet-type oxide can form a sintered body having higher lithium ion conductivity. The phrase "the garnet-type oxide does not contain crystals classified into a tetragonal crystal system, such as space group $I4_1/acd$" means that no peaks originating from crystals classified into a tetragonal crystal system, such as space group $I4_1/acd$, are observed in its XRD pattern.

In X-ray diffraction measurement of the ceramic powder, the peak of garnet-type oxide is observed in the range of 2 $\theta=16$ to $17°$. Specific methods and conditions for X-ray diffraction measurement are described in detail in the Examples below.

The method for producing the garnet-type oxide is not particularly limited, and known methods for producing a garnet-type oxide can be widely used. The section "3. Method for Producing Ceramic Powder" below describes the production method in detail.

Compound 1 contains at least one metal element selected from the group consisting of lanthanum, lithium, zirconium, gallium, scandium, yttrium, cerium, aluminum, calcium, magnesium, barium, strontium, niobium, and tantalum.

Examples of compound 1 include a compound containing the at least one metal element mentioned above and at least one element selected from the element group consisting of oxygen, hydrogen, carbon, nitrogen, fluorine, chlorine, bromine, iodine, phosphorus, sulfur, boron, and silicon. In the process of sintering the ceramic powder at a low temperature, it is assumed that compound 1 contributes to densification of the sintered body during the low-temperature sintering without destroying the garnet-type crystal structure, even when the constituent elements of compound 1 dissolve in the crystal structure of the garnet-type oxide to replace the constituent elements of the garnet-type oxide. Compounds 1 may be used alone, or in a combination of two or more.

Compound 1 is preferably a compound that contains lanthanum; more preferably a compound that contains lanthanum, and that does not contain scandium, aluminum, or magnesium; more preferably a compound that contains lanthanum, and that does not contain zirconium, scandium, yttrium, cerium, aluminum, calcium, magnesium, barium, strontium, niobium, or tantalum.

Examples of compound 1 include oxides, hydroxides, carbides, peroxides, chlorides, nitrides, halides, carbonates, nitrates, acetates, phosphates, sulfates, and the like. Of these, oxides are preferable. Examples of compound 1 in the form of an oxide include lanthanum oxide, a complex oxide of lanthanum and other metal elements, and the like. Compound 1 particularly preferably contains lanthanum oxide, or consists of lanthanum oxide.

When the ceramic powder contains lanthanum oxide, the peak of lanthanum oxide is observed in the range of 2 $\theta=29.7$ to $30°$ in X-ray diffraction measurement of the ceramic powder.

The ceramic powder may further contain compound 2 containing lithium. Compound 2 preferably has a property of turning into a liquid phase during low-temperature sintering at $1000°$ C. or lower to be introduced between particles, and preferably has a function of promoting element diffusion between the garnet-type oxide and compound 1 to further facilitate densification of the sintered body. From this viewpoint, compound 2 preferably has a melting point of $250°$ C. or higher and $1000°$ C. or lower, more preferably $400°$ C. or higher and $1000°$ C. or lower, still more preferably $500°$ C. or higher and $1000°$ C. or lower, and particularly preferably $600°$ C. or higher and $1000°$ C. or lower.

Examples of compound 2 include oxides, hydroxides, carbides, peroxides, chlorides, nitrides, halides, carbonates, nitrates, acetates, phosphates, sulfates, and the like. Compounds 2 may be used alone, or in a combination of two or more. Compound 2 preferably does not contain lanthanum. Examples of compound 2 include at least one member selected from the group consisting of lithium gallate ($LiGaO_2$, melting point: $950°$ C.), lithium carbonate ($LiCO_3$, melting point: $723°$ C.), lithium sulfate ($Li_2SO_4$, melting point: $859°$ C.), lithium nitrate ($LiNO_3$, melting point: $260°$ C.), and lithium hydroxide (LiOH, melting point: $462°$ C.). Compound 2 may consist of only lithium gallate.

When the ceramic powder contains lithium gallate, the peak of lithium gallate is observed in the range of 2 $\theta=21$ to $23°$ in X-ray diffraction measurement of the ceramic powder.

The ceramic powder may further contain compound 3. Compound 3 contains lanthanum and zirconium, and does not contain lithium or gallium.

Examples of compound 3 include oxides, hydroxides, carbides, peroxides, chlorides, nitrides, halides, carbonates, nitrates, acetates, phosphates, sulfates, and the like. Compound 3 is preferably an oxide. Compound 3 may be used alone, or in a combination of two or more.

When compound 3 is an oxide, examples of compound 3 include lanthanum zirconate ($La_2Zr_2O_7$), a composite oxide of lanthanum, zirconium, and a metal element other than lithium and gallium. It is particularly preferable that compound 3 contains lanthanum zirconate. For example, lanthanum zirconate is likely to be contained in a ceramic powder when the firing temperature is lower than $800°$ C. in the method for producing a ceramic powder described later.

Compound 3 may consist of only lanthanum zirconate, or compound 3 may further contain other compounds in addition to lanthanum zirconate.

When the ceramic powder contains lanthanum zirconate as compound 3, the peak of lanthanum zirconate is observed in the range of 2 $\theta=28.3$ to $28.7°$ in X-ray diffraction measurement of the ceramic powder.

The ceramic powder may also consist essentially of the garnet-type oxide and compound 1, and optionally compound 2 and/or compound 3. Alternatively, the ceramic powder may consist of only the garnet-type oxide and compound 1, and optionally compound 2 and/or compound 3. The phrase "consisting essentially of" means that an optional component other than the garnet-type oxide and compound 1, and the optionally contained compound 2 and/or compound 3 may be contained, as long as the effects of the present invention are not impaired. In particular, the phrase "the ceramic powder consists essentially of . . . " means that the ceramic powder can contain other optional components, as long as those optional components do not cause an adverse effect on the characteristics of the ceramic powder. The amount of the optional components is, for example, 5 wt % or less, preferably 1 wt % or less, more preferably 0.5 wt % or less, still more preferably 0.1 wt % or less, and particularly preferably 0.05 wt % % or less, based on the total weight of the ceramic powder. The ceramic powder preferably does not contain aluminum, magnesium, zinc, or scandium.

In all of the embodiments of the ceramic powder, compound 1 unavoidably contains, for example, a light rare-earth element, such as cerium, praseodymium, neodymium, samarium, and europium, as an impurity, in addition to the elements that can constitute compound 1. Further, in all of the embodiments of the ceramic powder, compound 1 unavoidably contains aluminum, magnesium, zinc, and scandium as mentioned above, as impurities. The term "impurity" as used herein refers to those detected at 1 wt % or less based on the total weight of the ceramic powder.

The ratio of the constituent elements in the ceramic powder is not particularly limited, as long as the effects of the present invention are not impaired. To more easily facilitate sintering at a low temperature, the value of the molar ratio La/Zr of lanthanum to zirconium is more than 1.5 and 1.6 or less, preferably 1.51 or more and 1.59 or less, more preferably 1.52 or more and 1.58 or less, and still more preferably 1.53 or more and 1.56 or less. The lower limit of the La/Zr value is never 1.50 or lower. The value of the molar ratio Ga/Zr of gallium to zirconium is preferably 0.075 or more and 0.18 or less, more preferably 0.08 or more and 0.17 or less, still more preferably 0.09 or more and 0.16 or less, and even more preferably 0.1 or more and 0.15 or less. The value of the molar ratio Li/Zr of lithium to zirconium is preferably 2.95 or more and 3.6 or less, more preferably 3.3 or more and 3.5 or less, and still more preferably 3.35 or more and 3.4 or less.

In the ceramic powder, the value of the ratio $I_b/I_a$ of maximum peak intensity $I_b$ in the range of $2\theta=29.7$ to $30°$ to maximum peak intensity $I_a$ in the range of $2\theta=16$ to $17°$ is preferably 0.02 or more and 0.2 or less, more preferably 0.025 or more and 0.1 or less, still more preferably 0.03 or more and 0.08 or less, and particularly preferably 0.035 or more and 0.075 or less, in X-ray diffraction measurement. In this case, the ratio of the garnet-type oxide to compound 1 (in particular, lanthanum oxide) in the ceramic powder becomes a more preferred value; and the sinterability, in particular, of the ceramic powder is easily improved.

In the ceramic powder that contains lanthanum zirconate, the value of the ratio $I_d/I_a$ of maximum peak intensity $I_d$ in the range of $2\theta=28.3$ to $28.7°$ to maximum peak intensity $I_a$ in the range of $2\theta=16$ to $17°$ is, for example, 0.03 or more, preferably 0.04 or more and 0.1 or less, more preferably 0.05 or more and 0.08 or less, and still more preferably 0.06 or more and 0.07 or less, in X-ray diffraction measurement. In this case, in the ceramic powder, the ratio of the garnet-type oxide to compound 3 (in particular, lanthanum zirconate) becomes a more preferred value; and the sinterability, in particular, of the ceramic powder is easily improved.

A molded body of the ceramic powder easily undergoes volumetric shrinkage by heat treatment, and easily forms a denser sintered body; in particular, the sinterability at low temperatures is excellent. Since the ceramic powder easily forms a dense sintered body, the obtained sintered body has, for example, excellent strength and high ionic conductivity.

The ceramic powder preferably generates lithium lanthanum gallate by heat treatment at 900° C. or higher. In this case, the sintered body obtained by using the ceramic powder can be more densified, and can have a high density. The generation of lithium lanthanum gallate can be confirmed by the presence of a diffraction peak in the range of $2\theta=22.7$ to $23.4°$ originating from the presence of lithium lanthanum gallate in the XRD measurement.

When lithium lanthanum gallate is generated by heat treatment of the ceramic powder at 900° C. or higher, the value of the ratio $I_c/I_a$ of maximum peak intensity $I_c$ in the range of $2\theta=22.7$ to $23.4°$ to maximum peak intensity $I_a$ in the range of $2\theta=16$ to $17°$ is preferably 0.012 or more and 0.06 or less, more preferably 0.014 or more and 0.04 or less, and still more preferably 0.015 or more and 0.035 or less, in X-ray diffraction measurement. In this case, the sinterability of the ceramic powder, in particular, is easily improved. Further, the density of the sintered body is further increased, and the ionic conductivity is easily improved.

When the molded body of the ceramic powder is subjected to heat treatment under conditions at a rate of 5° C./minute to 800° C. and then 1° C./minute from 800 to 950° C., the molded body preferably starts to undergo volumetric shrinkage at 800° C. or higher to achieve a heating dimensional change rate after the heat treatment of 5% or more. In this case, sintering of the ceramic powder easily proceeds at a low temperature, and the obtained sintered body is likely to have high ionic conductivity. The molded body of the ceramic powder is produced under the conditions for producing a molded body for sintering described in the sintering method explained in the Examples.

2. Sintered Body

A sintered body can be obtained using the ceramic powder described above. The method for obtaining the sintered body is not particularly limited. Known sintering methods and sintering conditions can be widely used. For example, a sintered body of the ceramic powder can be obtained by sintering a molded body of the ceramic powder that has been produced in advance (hereinafter, referred to as "the molded body for sintering").

The method for forming the molded body for sintering is not particularly limited; and a known molding means, such as a cold press or a cold isostatic press, or a combination of multiple known molding means, can be used. For the cold press, for example, the molding pressure can be adjusted to 1 to 20 MPa. For the cold isostatic press, the molding pressure can be adjusted to 100 to 300 MPa.

Before obtaining the molded body for sintering, the ceramic powder may be ground in advance. The method for grinding is not particularly limited. Examples include a method that uses a grinding mill, such as a planetary ball mill.

The sintering conditions are not particularly limited. In particular, the ceramic powder can be sintered at a temperature lower than the temperature conventionally used. For example, the sintering temperature can be 1000° C. or lower, and is preferably 950° C. or lower. The lower limit of the sintering temperature can be 900° C. or higher, and is preferably 930° C. or higher. The sintering time is also not particularly limited, and can be selected from the range of, for example, 1 to 30 hours, preferably 3 to 25 hours, more preferably 10 to 20 hours, according to the sintering temperature.

For sintering, for example, a powder-bed sintering method can also be used. The powder bed sintering method is a method in which a molded body for sintering is buried in the same powder as the ceramic powder used to foam this molded body; and, in this state, the molded body for sintering is sintered. This method is advantageous in that it is easy to prevent volatilization of the compositional components of the molded body for sintering.

The sintered body obtained by sintering the ceramic powder contains the garnet-type oxide, a first oxide, and a second oxide. The first oxide contains at least one metal element selected from the group consisting of lanthanum, lithium, zirconium, gallium, scandium, yttrium, cerium, aluminum, calcium, magnesium, barium, strontium, niobium, and tantalum. The second oxide contains lithium and gallium, and does not contain lanthanum. The garnet-type oxide contained in the sintered body is the same as the garnet-type oxide described in the section "1. Ceramic Powder."

The first oxide contains at least one metal element selected from the group consisting of lanthanum, lithium, zirconium, gallium, scandium, yttrium, cerium, aluminum, calcium, magnesium, barium, strontium, niobium, and tantalum. As long as this is satisfied, the type of the first oxide is not limited.

The first oxide is preferably lithium lanthanum gallate because the sintered body is more easily densified and more easily has a high density.

Whether lithium lanthanum gallate is present can be confirmed by the presence of a diffraction peak in the range of 2 θ=22.7 to 23.4° originating from the presence of lithium lanthanum gallate in the XRD measurement of the sintered body.

The crystal structure of lithium lanthanum gallate is not particularly limited. For example, the structure can have a non-garnet type cubic crystal system.

The second oxide contains lithium and gallium, and does not contain lanthanum. As long as this is satisfied, the type of the second oxide is not limited.

The second oxide is preferably lithium gallate because the sintered body is more easily densified and more easily has a high density.

Whether lithium gallate is present can be confirmed by the presence of a diffraction peak in the range of 2 θ=21 to 23° originating from the presence of lithium lanthanum gallate in the XRD measurement of the sintered body.

The crystal structure of lithium gallate is not particularly limited. For example, the structure can be a crystal structure having an orthorhombic crystal system, or an amorphous structure. Lithium gallate can have both a crystal structure having an orthorhombic crystal system and an amorphous structure.

The sintered body can contain, for example, a main phase and at least one first phase in addition to the main phase. The main phase can be composed of the garnet-type oxide. The first phase has a composition and/or crystal system different from that of the main phase, and can be composed of the first oxide. In this case, the sintered body is more easily densified, and more easily has a high density.

The sintered body may further contain at least one second phase in addition to the main phase and the first phase. The second phase has a composition and/or crystal system different from that of the main phase or the first phase, and is composed of the second oxide. In this case, the sintered body is furthermore easily densified, and more easily has a high density.

In the sintered body, the ratio $I_c/I_a$ of maximum peak intensity $I_c$ in the range of 2 θ=22.7 to 23.4° to maximum peak intensity $I_a$ in the range of 2 θ=16 to 17° is 0.012 or more and 0.06 or less, preferably 0.014 or more and 0.04 or less, and more preferably 0.015 or more and 0.035 or less, in X-ray diffraction measurement.

In the sintered body, the value of the molar ratio La/Zr of lanthanum to zirconium is more than 1.5 and 1.6 or less, preferably 1.51 or more and 1.59 or less, more preferably 1.52 or more and 1.58 or less, and still more preferably 1.53 or more and 1.56 or less. The lower limit of the La/Zr value is never 1.50 or lower. The value of the molar ratio Ga/Zr of gallium to zirconium is preferably 0.075 or more and 0.18 or less, more preferably 0.08 or more and 0.17 or less, still more preferably 0.09 or more and 0.16 or less, and even more preferably 0.1 or more and 0.15 or less. The value of the molar ratio Li/Zr of lithium to zirconium is preferably 2.95 or more and 3.6 or less, more preferably 3.3 or more and 3.5 or less, and still more preferably 3.35 or more and 3.4 or less.

The sintered body may consist essentially of the garnet-type oxide, the first oxide, and the second oxide. Alternatively, the sintered body may consist of only the garnet-type oxide, the first oxide, and the second oxide. The phrase "consisting essentially of" as used herein means that an optional component other than the garnet-type oxide, the first oxide, and the second oxide may be contained, as long as the effects of the present invention are not impaired. In particular, the phrase "the sintered body consists essentially of" means that the sintered body may contain other optional components as long as those optional components do not cause an adverse effect on the characteristics of the sintered body. The sintered body preferably does not contain aluminum, magnesium, zinc, or scandium.

When the ceramic powder is used to obtain a sintered body, the resulting sintered body tends to become dense, even if sintering is performed at a low temperature; in other words, the density easily increases. Further, when the ceramic powder is used to obtain a sintered body, sintering can be performed at a low temperature; thus, volatilization of lithium or the like is less likely to occur. Consequently, the sintered body of the ceramic powder can have high ionic conductivity. For example, to easily achieve excellent strength and excellent ionic conductivity, the sintered body of the ceramic powder preferably has a density of 4.5 to 5.1 g/cm$^3$, more preferably 4.6 to 5.1 g/cm$^3$, and even more preferably 4.7 to 5.1 g/cm$^3$.

The value of the ionic conductivity $\sigma_T$ determined based on the total resistance value of the sintered body of the ceramic powder is not particularly limited. From the viewpoint of application to all-solid lithium secondary batteries, the value at room temperature (e.g., 30° C.) is preferably 1×10$^{-4}$ S/cm or more, more preferably 2×10$^{-4}$ S/cm or more and 30×10$^{-4}$ S/cm or less, still more preferably 4×10$^{-4}$ S/cm or more and 20×10$^{-4}$ S/cm or less, and even more preferably 6×10$^{-4}$ S/cm or more and 15×10$^{-4}$ S/cm or less.

The activation energy ($E_a$) for lithium ion conduction of the sintered body can be calculated, for example, by evaluating the temperature dependence of $\sigma_T$. Specifically, the activation energy for lithium ion conduction of the sintered body can be calculated from the slope of a graph (Arrhenius plot) showing the temperature dependence of lithium ion conductivity, using the Arrhenius equation: $\sigma = \sigma_0 \exp(-E_a/$ RT) (wherein ($\sigma$: lithium ion conductivity, $\sigma_0$: frequency factor, R: gas constant, and T: absolute temperature). The $E_a$ value of the sintered body calculated by the above method is not particularly limited, and is preferably 18 to 28 kJ/mol, more preferably 18 to 25 kJ/mol, and particularly preferably 18 to 21 kJ/mol, from the viewpoint of application to all-solid lithium secondary batteries in a wide temperature range.

The ceramic powder sintered body can be suitably used for various batteries, such as secondary batteries and fuel cells; and, in particular, for all-solid lithium-ion secondary batteries and the like. The ceramic powder sintered body can also be applied to gas sensors and the like.

3. Method for Producing Ceramic Powder

The method for producing a ceramic powder is not particularly limited, and known methods for producing a ceramic powder, such as solid-phase methods and liquid-phase methods, can be widely used. More specifically, a ceramic powder can be produced by, for example, mixing a raw material that serves as a zirconium source, a raw material that serves as a lanthanum source, a raw material that serves as a lithium source, and raw materials that serve as supply sources of other elements that constitute the ceramic powder (other element sources) in any order according to known methods to form a precipitate; optionally adding to the precipitate a raw material that serves as a supply source of an element that has not yet been added, to incorporate the element that has not been added; and firing the obtained precipitate.

In the ceramic powder, when compound 1 contains zirconium, lanthanum, or lithium, the raw materials that serve as the supply sources of these elements (zirconium source, lanthanum source, and lithium source) may contain these elements in excess number of moles with respect to the stoichiometric composition of the garnet-type oxide. The stoichiometric composition of the garnet-type oxide as used herein is, for example, $Li_7La_3Zr_2O_{12}$ when the garnet-type oxide is lithium lanthanum zirconate. When the garnet-type oxide is lithium lanthanum zirconate containing gallium, the stoichiometric composition is, for example, $Li_{7-3x}Ga_xLa_3Zr_2O_{12}$ (wherein $0.15 \leq x \leq 0.35$). In other words, the phrase "lanthanum in excessive number of moles with respect to the stoichiometric composition of garnet-type oxide" can mean that the ratio La/Zr of lanthanum to zirconium contained in the raw material used in the production of ceramic powder is more than 1.5.

In a preferred embodiment of the method for producing a ceramic powder, the garnet-type oxide contained in the obtained ceramic powder is lithium lanthanum zirconate containing gallium and having a stoichiometric composition of $Li_{7-3x}Ga_xLa_3Zr_2O_{12}$ (wherein $0.15 \leq x \leq 0.35$), and compound 1 is lanthanum oxide. The ceramic powder obtained in this embodiment can be produced by, for example, mixing a zirconium-containing solution, a lanthanum-containing solution, to which lanthanum has been added to achieve the molar ratio La/Zr of more than 1.5, preferably more than 1.5 and 1.6 or less, and more preferably 1.51 or more and 1.59 or less, and a gallium-containing solution to form a precipitate; adding a lithium-containing solution to the obtained precipitate, followed by mixing; firing the mixture; and grounding the fired product. The mixing conditions of various raw materials and the grinding conditions of the fired product may be appropriately set by those skilled in the art.

Each raw material serving as the supply source of each element contained in the ceramic powder is not particularly limited, and compounds known to those skilled in the art can be appropriately used in the foam of a salt, a solution, a dispersion, or the like.

Examples of the raw material that serves as the zirconium source include a solution containing a zirconium carbonate complex (e.g., ammonium zirconium carbonate complex).

Examples of the raw material that serves as the lanthanum source include lanthanum-containing nitrate, acetate, chloride, and the like. More specific examples include aqueous solutions of lanthanum nitrate, lanthanum acetate, lanthanum chloride, and the like, with an aqueous solution of lanthanum nitrate being preferable.

Examples of the raw material that serves as the lithium source include lithium-containing oxide, hydroxide, carbonate, hydrogen carbonate, nitrate, sulfate, acetate, citrate, oxalate, and the like. More specific examples include aqueous solutions of lithium oxide, lithium hydroxide, lithium chloride, lithium carbonate, lithium hydrogen carbonate, lithium nitrate, lithium sulfate, lithium acetate, lithium citrate ($Li_3C_6H_5O_7$), lithium oxalate ($Li_2(COO)_2$), and the like, with an aqueous solution of lithium nitrate being preferable.

When the garnet-type oxide contains gallium, examples of the raw materials that serve as the other element sources include a raw material that serves as a gallium source. Examples of the raw material that serves as the gallium source include gallium-containing nitrate, acetate, chloride, and the like. More specific examples include aqueous solutions of gallium nitrate, gallium acetate, gallium chloride, and the like, with an aqueous solution of gallium nitrate being preferable.

The raw material that serves as the supply source of each element may be a solid or a solution. When the raw material that serve as the supply source of an element is a solution, the solvent may be water alone or a mixed solvent of water and an organic solvent, such as an alcohol.

The amount of lithium contained in the raw materials in a state of a mixture of each raw material is such that the molar ratio of lithium to zirconium (number of moles of Li/number of moles of Zr) is preferably 2.95 or more and 3.6 or less, more preferably 3.3 or more and 3.5 or less, and still more preferably 3.35 or more and 3.4 or less.

When the ceramic powder contains gallium, the amount of gallium contained in the raw materials in a state of a mixture of each raw material is such that the molar ratio of gallium to zirconium (number of moles of Ga/number of moles of Zr) is preferably 0.075 or more and 0.18 or less, more preferably 0.08 or more and 0.17 or less, still more preferably 0.09 or more and 0.16 or less, and even more preferably 0.1 or more and 0.15 or less.

In addition to the raw material that serves as a gallium source, other raw materials that serve as the other element sources can be used, and the type thereof is not particularly limited. Examples of the raw materials that serve as the other element sources other than the raw material that serves as a gallium source include nitrates, acetates, chlorides, and the like that contain at least one metal element selected from the group consisting of scandium, yttrium, cerium, aluminum, calcium, magnesium, barium, strontium, niobium and tantalum; solutions thereof; and the like.

The precipitate obtained by mixing the raw materials can also be heated to a temperature of 80° C. or higher, preferably 90° C. or higher. The heating method is not particularly limited. For example, the solution in which the precipitate is formed (slurry) can be directly heated without filtering the precipitate.

In a preferred embodiment of the method for producing a ceramic powder, a raw material that serves as a lithium source is added to a precipitate obtained by mixing a zirconium-containing solution, a lanthanum-containing solution, and a gallium-containing solution. In this embodiment, the method of mixing the raw material that serves as a lithium source and the precipitate is not particularly limited. For example, a method can be used in which the precipitate is separated by filtration in advance, and then the precipitate is mixed with the raw material that serves as a lithium source. The raw material that serves as a lithium source and the precipitate may be mixed by using a generally known kneader or mixer, such as a powder mixer, an automatic mortar, a grinding mill, or a ball mill. The mixing conditions can be appropriately set by those skilled in the art.

When the raw material that serves as a lithium source is a solution, the precipitate may be dispersed again in the solution of the raw material that serves as a lithium source to obtain a dispersion. The thus-obtained dispersion may be evaporated to dryness to give a mixture, as a solid, of lithium and the precipitate. The method for evaporation to dryness is not particularly limited, and generally known drying techniques may be used. For example, evaporation to dryness may be performed by using a stationary dryer, a conveyor dryer, a rotary dryer, a stirring dryer, a reduced-pressure dryer, a spray dryer, a vacuum-freeze dryer, or the like. The conditions for evaporation to dryness can be appropriately set by those skilled in the art.

The ceramic powder can be obtained by firing the precipitate or the mixture obtained as described above. The firing temperature can be adjusted to, for example, 1000° C. or lower, preferably 900° C. or lower, and more preferably 800° C. or lower, to make volatilization of lithium less likely to occur. The lower limit of the firing temperature is not particularly limited as long as a fired product can be obtained. For example, the lower limit of the firing temperature may be 450° C., and preferably 550° C. The firing time can be appropriately set according to the firing temperature, and is, for example, 1 to 10 hours, and preferably 1 to 3 hours.

The obtained fired product contains the garnet-type oxide. The garnet-type oxide, which is the obtained fired product, can have, for example, a fine particle shape. The fired product obtained by firing can be subjected to treatment such as grinding, if necessary.

4. Battery

The sintered body of the ceramic powder has excellent ionic conductivity, and is thus suitable for application to batteries, particularly suitable for use in all-solid lithium secondary batteries.

An all-solid lithium secondary battery can comprise, for example, a positive electrode layer containing a positive electrode active material, a negative electrode layer containing a negative electrode active material, and a solid electrolyte layer interposed between the positive electrode layer and the negative electrode layer. At least one layer selected from the positive electrode layer, the negative electrode layer, and the solid electrolyte layer may contain a sintered body of the ceramic powder.

The positive electrode layer contains at least a positive electrode active material, and optionally further contains at least one member selected from lithium ion-conductive materials, electron conduction aids, and binding materials.

The lithium ion-conductive material contained in the positive electrode layer preferably contains a sintered body of the ceramic powder. The content of the sintered body in the positive electrode layer is not particularly limited; and may be, for example, 0.1 volume % to 80 volume %, based on the total volume of the positive electrode layer. In particular, the content is preferably 1 volume % to 60 volume %, and more preferably 10 volume % to 50 volume %. The thickness of the positive electrode layer is not particularly limited, and is preferably, for example, 0.1 µm to 1000 µm.

The positive electrode active material may be selected from a wide variety of known materials. The content of the positive electrode active material in the positive electrode layer is also not particularly limited, and may be the same as that used in known all-solid lithium secondary batteries.

The positive electrode layer may further contain a known electron conduction aid or a binding material, or both, in addition to a positive electrode active material and a lithium ion-conductive material.

The method for forming the positive electrode layer is not particularly limited, and may be the same as a known method.

The negative electrode layer contains at least a negative electrode active material, and may optionally further contain at least one member selected from lithium ion-conductive materials, electron conduction aids, and binding materials.

The lithium ion-conductive material contained in the negative electrode layer preferably contains a sintered body of the ceramic powder. The content of the sintered body in the negative electrode layer is not particularly limited; and may be, for example, 0.1 volume % to 80 volume %, based on the total volume of the negative electrode layer. In particular, the content is preferably 1 volume % to 60 volume %, and more preferably 10 volume % to 50 volume %. The thickness of the negative electrode layer is not particularly limited, and is preferably, for example, 0.1 µm to 1000 µm.

The negative electrode active material is not particularly limited, as long as it is a material capable of electrochemically storing and releasing lithium ions; and known materials can be widely used. The content of the negative electrode active material in the negative electrode layer is also not particularly limited, and may be the same as that used in known all-solid lithium secondary batteries.

The negative electrode layer may further contain a known electron conduction aid or a binding material, or both, in addition to a negative electrode active material and a lithium ion-conductive material.

The method for forming the negative electrode layer is also not particularly limited, and may be the same as a known method.

A negative electrode current collector for collecting current from the negative electrode layer can be disposed, for example, on a surface of the negative electrode layer opposite to the surface on which the solid electrolyte layer is provided. The materials for the negative electrode current collector are also not limited, and known materials for negative electrode current collectors can be widely used.

The solid electrolyte layer is interposed between a positive electrode layer and a negative electrode layer, and contains a lithium ion-conductive material. The lithium ion-conductive material contained in the solid electrolyte layer is not particularly limited, as long as it has lithium ion conductivity.

The lithium ion-conductive material contained in the solid electrolyte layer is preferably a sintered body of the ceramic powder. The content of the sintered body in the solid electrolyte layer is not particularly limited, as long as the electronic conductivity is sufficiently suppressed. For example, the content is preferably 50 volume % to 100 volume %.

The solid electrolyte layer may further contain, for example, a known lithium ion-conductive material, in addition to the garnet type oxide.

The thickness of the solid electrolyte layer is not particularly limited, as long as it is a thickness that can prevent a short circuit of the all-solid lithium secondary battery. For example, the thickness can be adjusted to 0.1 μm to 1000 μm. In particular, the thickness is preferably 0.1 μm to 300 μm.

The method for forming the solid electrolyte layer is not particularly limited, and a method that is similar to a known forming method can be used.

The all-solid lithium secondary battery may be, for example, coin-shaped, laminar, cylindrical, or rectangular.

The method for producing the all-solid lithium secondary battery may be a method that is similar to general methods for producing an all-solid lithium secondary battery. For example, an all-solid lithium secondary battery is produced by stacking the positive electrode layer, the solid electrolyte layer, and the negative electrode layer described above in this order.

EXAMPLES

The present invention is described in more detail below with reference to Examples. However, the present invention is not limited to the embodiments of these Examples.
Evaluation Method
X-Ray Diffraction Measurement The X-ray diffraction measurement (XRD) of powders was performed under the following conditions.
Measurement Conditions
Measurement device: X-ray diffractometer (RINT2500, produced by Rigaku Corporation)
Source: Cu-Kα radiation source
Tube voltage: 50 kV
Tube current: 300 mA
Scanning speed: 4° 2θ/min
For the XRD measurement of a sintered body, a cylindrical sintered body obtained by the sintering method described later was ground in a mortar, and the obtained product that was formed into a powder was subjected to the measurement under conditions similar to the above.

In the XRD measurement, the diffraction peak observed at 2 θ=16 to 17° was considered to be a diffraction peak originating from a garnet-type oxide having a cubic crystal system (ICDD: 045-0109), which is the main component of the ceramic powder, and the intensity of the highest intensity peak in this range was expressed as $I_a$.

In the XRD measurement, the diffraction peak observed at 2 θ=29.7 to 30° was considered to be a diffraction peak originating from lanthanum oxide having a hexagonal crystal system (ICDD: 05-0602), and the intensity of the highest intensity peak in this range was expressed as $I_b$.

In the XRD measurement, the diffraction peak observed at 2 θ=22.7 to 23.4° was considered to be a diffraction peak originating from lithium lanthanum gallate having a cubic crystal system (ICDD: 00-046-1248), and the intensity of the highest intensity peak in this range was expressed as $I_c$.

In the XRD measurement, the diffraction peak observed at 2 θ=28.3 to 28.7° was considered to be a diffraction peak originating from lanthanum zirconate having a cubic crystal system (ICDD: 73-0444), and the intensity of the highest intensity peak in this range was expressed as $I_d$.

The content ratios of lanthanum oxide or lanthanum zirconate to garnet-type oxide having a cubic crystal system contained in the ceramic powder were shown by using the intensity ratio of each X-ray diffraction peak as shown in the following formulas.

Lanthanum oxide/garnet-type oxide having a cubic crystal system=$I_b/I_a$

Lanthanum zirconate/garnet-type oxide having a cubic crystal system=$I_d/I_a$

Further, the content ratio of lithium lanthanum gallate to garnet-type oxide having a cubic crystal system contained in the sintered body was shown by using the intensity ratio of each X-ray diffraction peak as shown in the following formula. Lithium lanthanum gallate/garnet-type oxide having a cubic crystal system=$I_c/I_a$
Sintering Method Sintered bodies were produced by the following method. First, as a pretreatment, each of the obtained ceramic powders of the Examples and Comparative Examples was ground in a planetary ball mill under the following conditions.
Grinding Conditions
Device: Planetary ball mill (Pulverisette 6, produced by Fritsch GmbH)
Rotation speed: 400 rpm
Grinding time: 30 min The powder obtained by grinding was molded into a cylindrical shape under the cold press conditions described below, and pressed under the cold isostatic press conditions described below to obtain a molded body for sintering. The obtained molded body for sintering was heat-treated at 950° C. for 25 hours, thereby obtaining a cylindrical sintered body.
Cold Press Conditions
Device name: 100 kN Newton Press (NT-100H-V09, produced by NPa SYSTEM Co., Ltd.)
Molding pressure: 14 MPa
Mold: φ=20 mm, with a thickness of 31 mm
Cold Isostatic Press Conditions
Device name: Space-saving CIP equipment for R&D, Dr. CIP (produced by Kobe Steel, Ltd.)
Molding pressure: 245 MPa
Measurement of Density of Sintered Body The density g/cm³ of the sintered body obtained by the "Sintering Method" above was calculated from the dimensions (diameter φ, thickness d of the cylinder) and the mass w of the cylindrical sintered body by using the following equation.

Density (g/cm³)=$w/\{(\varphi/2)^2 \times \Pi \times d\}$

Measurement of Heating Dimensional Change Rate

After the ceramic powder was molded into a rectangular parallelepiped shape by a cold press, the resulting product was further pressed by a cold isostatic press to thus obtain a rectangular parallelepiped molded body.

The thus-obtained rectangular parallelepiped molded body was heated while applying a load, and the long-side dimension of the molded body before and after the heating was measured to thus calculate the heating dimensional change rate. The heating dimensional change rate was calculated by using the following equation, in which $L_0$ represents the long-side dimension of the molded body before the heating, and $L_1$ represents the long-side dimension of the molded body after the heating.

Heating dimensional change rate (%)=$(L_1-L_0)/L_0 \times 100$

The molded body was heated by the following method.
Heating Conditions
　　Measurement device: Thermomechanical analyzer for horizontal operation (TD5000SA, produced by Bruker AXS. K.K.)
　　Heating program: The temperature was increased at a rate of 5° C./min from 20 to 800° C., and then at a rate of at 1° C./min from 800 to 950° C.
　　Standard sample: Alumina standard sample (long side: 18 mm)
　　Load: 10 g The cold press conditions and the cold isostatic press conditions used to obtain a sample for measuring the heating dimensional change rate were as follows.

Cold Press Conditions
　　Device name: Hydraulic Press (produced by Marushichi Engineering Co., Ltd.)
　　Molding pressure: 3 MPa
　　Mold: 20 mm (long side)×5 mm (short side)
Cold Isotropic Press Conditions
　　Device name: Space-saving CIP equipment for R&D, Dr. CIP (produced by Kobe Steel, Ltd.)
　　Molding pressure: 245 MPa Measurement of Ionic Conductivity of Sintered Body The sintered body for use in measuring the lithium ion conductivity $\sigma_T$ of a sintered body was produced under conditions similar to those used for the cylindrical sintered body obtained by the sintering method described above. An electrode was formed by applying a conductive carbon paste to both surfaces of the cylindrical sintered body, followed by drying. The resulting product was fixed between stainless steel plates connected to a platinum wire, and maintained in a thermostatic bath in an air atmosphere to perform an alternating-current impedance measurement under the following conditions.

Alternating-Current Impedance Measurement Conditions
　　Device name: Solartron frequency response analyzer (Model: 1255B) and potentiogalvanostat (Model: 1287)
　　Measurement frequency range: 1 Hz to 1 MHz
　　Measurement temperature range: 30 to 60° C.

Raw Materials

In the Examples below, the following first raw material containing a zirconium carbonate complex (Zr source), second raw material containing lanthanum (La source), third raw material containing gallium (Ga source), and fourth raw material containing lithium (Li source) were used.

First Raw Material (Zr Source)

An ammonium zirconium carbonate aqueous solution prepared as described below (hereinafter referred to as "the AEC aqueous solution") was used as the Zr source. Basic zirconium carbonate ($Zr(OH)_{3.2}(CO_3)_{0.4}\cdot 7H_2O$, produced by Daiichi Kigenso Kagaku Kogyo Co., Ltd.), ammonium hydrogen carbonate, which is one of carbonates, and tartaric acid as a chelating agent were dissolved in pure water, and the pH of the solution was adjusted to 8.0 using ammonium water. The molar ratio of carbonates/Zr was 6.59, and the molar ratio of tartaric acid/Zr was 0.06. The thus-obtained AZC aqueous solution was an aqueous solution of zirconium carbonate-$NH_4$ complex, and has a Zr concentration of 1.96%. The expression "%" here represents a weight percent concentration; the same applies hereinafter.

Second Raw Material (La Source)

An $La(NO_3)_3$ aqueous solution (La concentration: 16.2%) was used as the La source.

Third Raw Material (Ga Source)

A $Ga(NO_3)_3$ aqueous solution (Ga concentration: 12.6%) was used as the Ga source.

Fourth Raw Material (Li Source)

A $LiNO_3$ aqueous solution (Li concentration: 3.2%) was used as the Li source.

Example 1

While 269.2 g of the AZC aqueous solution was stirred at room temperature, a liquid mixture of 76.11 g of the $La(NO_3)_3$ aqueous solution and 4.00 g of the $Ga(NO_3)_3$ aqueous solution was added thereto dropwise at 10 mL per minute to obtain a slurry containing a precipitate.

The obtained slurry containing a precipitate was stirred for 2 hours while heating to 90° C., followed by suction filtration. The filtered material was washed with 2000 mL of pure water, water was removed, and the precipitate was separated from the slurry. The obtained precipitate was added to 42.0 g of the $LiNO_3$ aqueous solution and dispersed by stirring to obtain a slurry. The resulting slurry was heated and dried at 90° C. to obtain a mixture as a dry powder. The dry powder was fired at 800° C. for 3 hours to obtain a ceramic powder.

Example 2

A ceramic powder was produced in the same manner as in Example 1, except that the amount of the AZC aqueous solution used was changed to 268.04 g, the amount of the $La(NO_3)_3$ aqueous solution used was changed to 75.80 g, the amount of the $Ga(NO_3)_3$ aqueous solution used was changed to 4.78 g, and the amount of the $LiNO_3$ solution used was changed to 41.48 g.

Example 3

A ceramic powder was produced in the same manner as in Example 1, except that the amount of the AZC aqueous solution used was changed to 265.92 g, the amount of the $La(NO_3)_3$ aqueous solution used was changed to 76.42 g, the amount of the $Ga(NO_3)_3$ aqueous solution used was changed to 4.74 g, and the amount of the $LiNO_3$ aqueous solution used was changed to 41.51 g.

Example 4

A ceramic powder was obtained in the same manner as in Example 1, except that the firing temperature of the dry powder (mixture) was changed to 750° C.

Comparative Example 1

A ceramic powder was produced in the same manner as in Example 1, except that the amount of the AZC aqueous solution used was changed to 273.52 g, the amount of the $La(NO_3)_3$ aqueous solution used was changed to 75.59 g, the amount of the $Ga(NO_3)_3$ aqueous solution used was changed to 3.25 g, and the amount of the $LiNO_3$ aqueous solution used was changed to 42.06 g.

Comparative Example 2

A ceramic powder was produced in the same manner as in Example 1, except that the amount of the AZC aqueous solution used was changed to 272.19 g, the amount of the $La(NO_3)_3$ aqueous solution used was changed to 75.22 g, the amount of the Ga(NO$_3$)$_3$ aqueous solution used was changed to 4.05 g, and the amount of the LiNO$_3$ aqueous solution used was changed to 5.44 g.

Comparative Example 3

A ceramic powder was produced in the same manner as in Example 1, except that the amount of the AZC aqueous solution used was changed to 245.35 g, the amount of the La(NO$_3$)$_3$ aqueous solution used was changed to 81.81 g, the amount of the Ga (NO$_3$)$_3$ aqueous solution used was changed to 4.38 g, and the amount of the LiNO$_3$ aqueous solution used was changed to 41.50 g.

Results

Table 1 shows various physical properties of the ceramic powder produced in Examples 1 to 4 and Comparative Examples 1 to 3, as well as physical properties of the cylindrical sintered bodies produced from these powders.

Example 1 having a value of La/Zr (molar ratio) of 1.50 was also considered to not contain lanthanum oxide.

Figure 2:
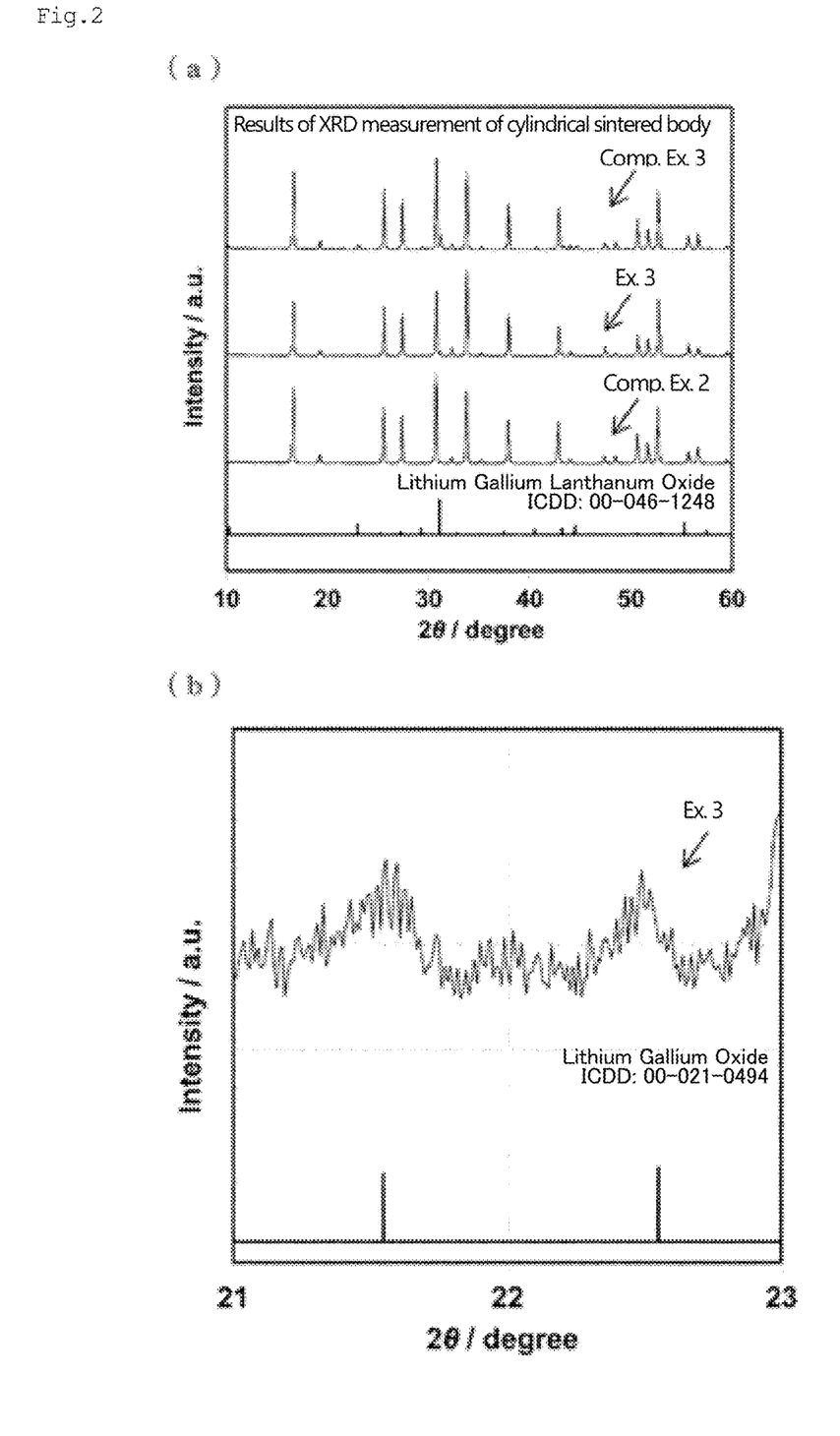
FIG. 2 shows examples of the XRD measurement results of the sintered bodies of the ceramic powders obtained in Example 3, Comparative Example 2, and Comparative Example 3.

As shown in FIG. 2(a), the cylindrical sintered body produced using the ceramic powder of Example 3 showed a diffraction peak in the range of 2 θ=22.7 to 23.4° originating from the presence of lithium lanthanum gallate in the XRD measurement. FIG. 2(b) is an enlarged view of the range of 2 θ=21 to 23° in the XRD spectrum of the cylindrical sintered body produced by using the ceramic powder of Example 3 of FIG. 2(a). In this XRD spectrum, a peak of lithium gallate was observed in the range of 2 θ=21 to 23°.

In contrast, as shown in FIG. 2(a), the cylindrical sintered body produced by using the ceramic powder of Comparative Example 2 showed no diffraction peak in the range of 2 θ=22.7 to 23.4° originating from the presence of lithium lanthanum gallate in the XRD measurement.

Further, as shown in FIG. 2(a), the cylindrical sintered body produced by using the ceramic powder of Comparative

TABLE 1

| Evaluation item | | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
| Powder composition (molar ratio) | La/Zr | 1.53 | 1.53 | 1.56 | 1.53 | 1.50 | 1.50 | 1.81 |
| | Ga/Zr | 0.12 | 0.15 | 0.15 | 0.12 | 0.10 | 0.12 | 0.15 |
| | Li/Zr | 3.35 | 3.35 | 3.35 | 3.35 | 3.30 | 3.35 | 3.63 |
| Physical properties of powder | $I_b/I_a$ | 0.060 | 0.057 | 0.071 | 0.039 | ND | ND | 0.249 |
| | $I_d/I_a$ | ND | ND | ND | 0.061 | 0.026 | ND | ND |
| Physical properties of sintered body | $I_c/I_a$ | 0.022 | 0.019 | 0.031 | 0.016 | 0.010 | 0.010 | 0.065 |
| | Density/gcm$^{-3}$ | 4.94 | 4.95 | 4.76 | 4.72 | 3.97 | 4.33 | 3.69 |
| | σT (30° C.)/Scm$^{-1}$ | 7.95 × 10$^{-4}$ | 8.01 × 10$^{-4}$ | 9.61 × 10$^{-4}$ | 4.30 × 10$^{-4}$ | 3.30 × 10$^{-5}$ | 1.22 × 10$^{-4}$ | 1.49 × 10$^{-5}$ |
| | Ea/kJmol$^{-1}$ | 21.30 | 21.78 | 19.93 | 21.60 | 29.31 | 34.12 | 30.64 |

*In the table, "ND" indicates that $I^b$ or $I^d$ was not significantly detected.

As shown in Table 1, the La/Zr value (molar ratio) of each of the ceramic powders obtained in Examples 1 to 4 was more than 1.5, which is the stoichiometric composition of garnet-type oxide having a cubic crystal system. This indicated that the ceramic powders of Examples 1 to 4 contained an excess amount of La, compared to the amount required for forming garnet-type oxide having a cubic crystal system. On the other hand, the value of each of the ceramic powders obtained in Comparative Examples 1 and 2 was 1.50, which is the stoichiometric composition of garnet-type oxide having a cubic crystal system (i.e., not more than 1.5).

Figure 1:
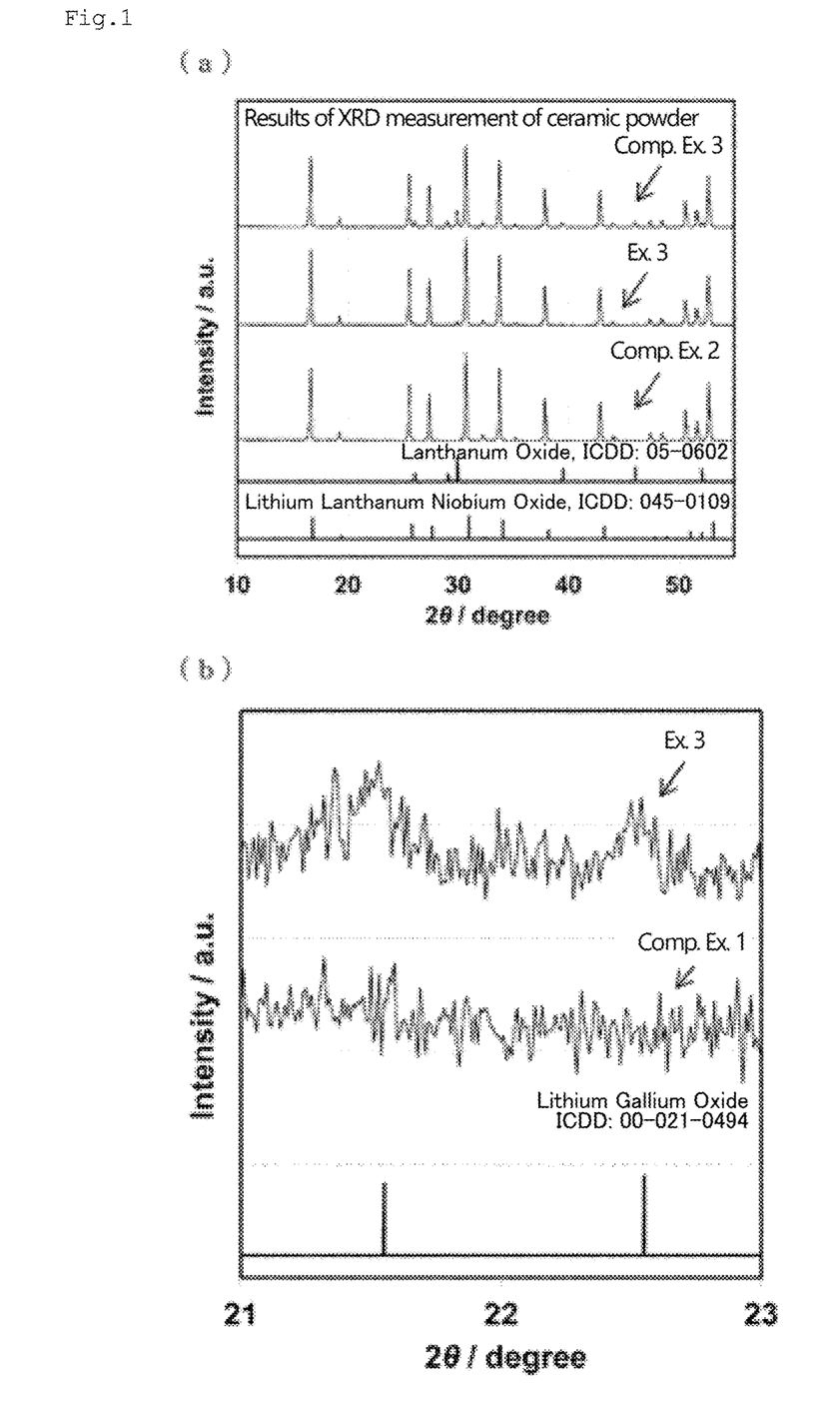
FIG. 1 shows examples of the XRD measurement results of the ceramic powders obtained in Example 3, Comparative Example 2, and Comparative Example 3.

As shown in FIG. 1(a), the ceramic powder of Example 3 showed a diffraction peak in the range of 2 θ=29.7 to 30° originating from the presence of lanthanum oxide in the XRD measurement. FIG. 1(b) is an enlarged view of the range of 2 θ=21 to 23° in the XRD spectrum of the powder obtained in Example 3 of FIG. 1(a) (the XRD of the powder obtained in Comparative Example 1 is also shown as a reference). In the XRD spectrum, a peak of lithium gallate was observed in the range of 2 θ=21 to 23°.

Accordingly, lanthanum oxide and lithium gallate were considered to be generated in the production process of the ceramic powders of Examples 1 to 4.

In contrast, as shown in FIG. 1(a), the ceramic powder of Comparative Example 2 having a value of La/Zr (molar ratio) of 1.50 showed no diffraction peak in the range of 2 θ=29.7 to 30° originating from the presence of lanthanum oxide in the XRD measurement. Therefore, the ceramic powder of Comparative Example 2 was considered to not contain lanthanum oxide. Like the ceramic powder of Comparative Example 2, the ceramic powder of Comparative Example 3 showed a diffraction peak originating from the presence of lithium lanthanum gallate in the XRD measurement, as in Example 3. Further, the $I_c/I_a$ value shown in Table 1 indicated that the ratio of lithium lanthanum gallate was the highest among the cylindrical sintered bodies of Examples 1 to 4 and Comparative Examples 1 to 3.

Figure 3:
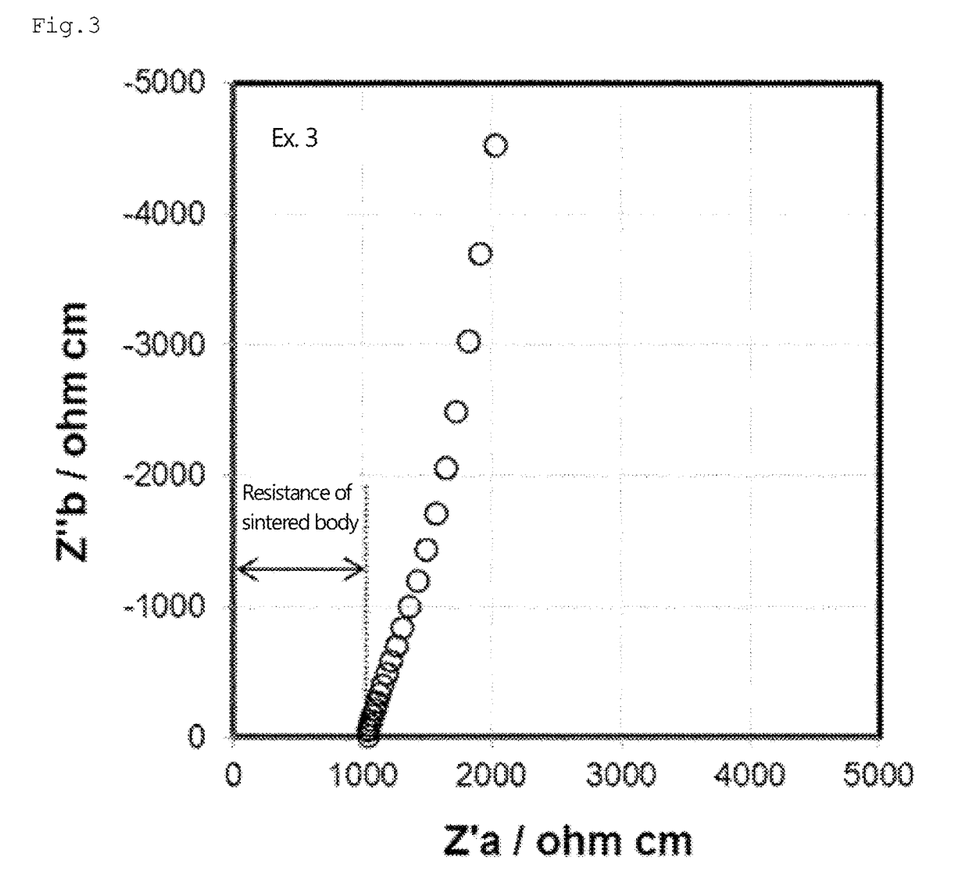
FIG. 3 shows an example of the measurement results of AC impedance of the sintered body of the ceramic powder obtained in Example 3.
Figure 4:
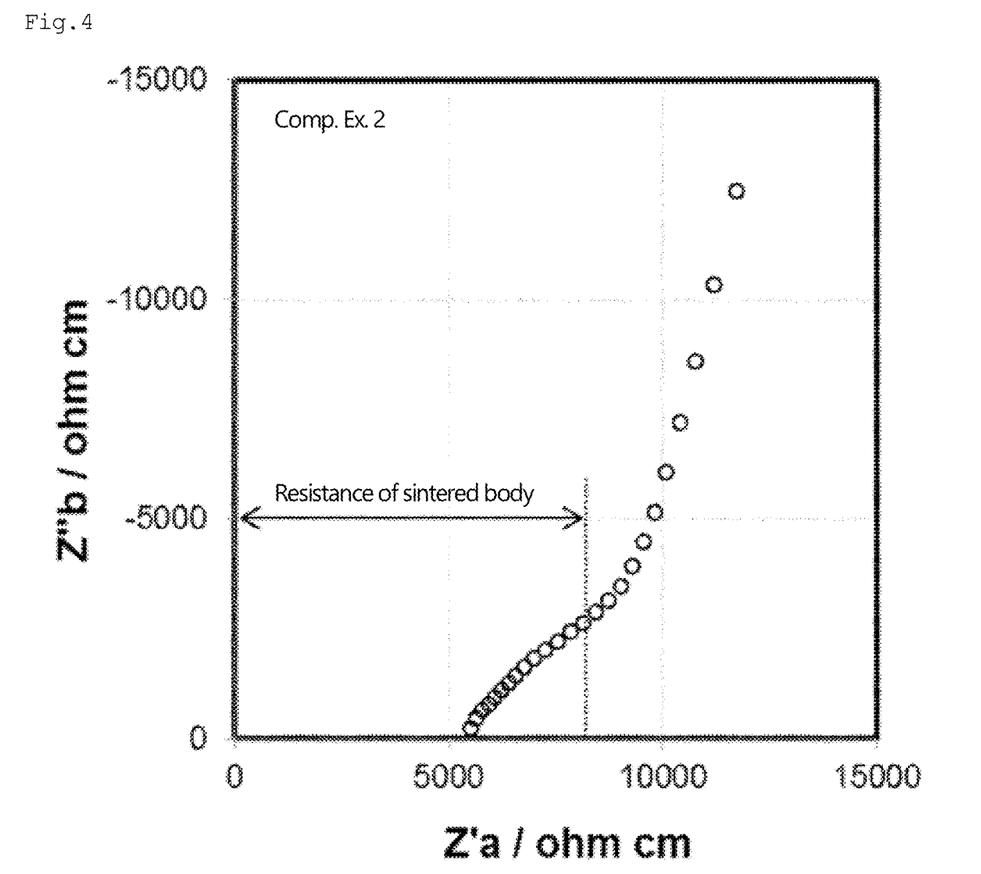
FIG. 4 shows an example of the measurement results of AC impedance of the sintered body of the ceramic powder obtained in Comparative Example 2.

The lithium ion conductivity ($\sigma_T$) of each of the cylindrical sintered bodies of Example 3 and Comparative Example 2 was calculated based on the resistance of the sintered body (total resistance including the bulk resistance component and the grain boundary resistance component), as shown in the AC impedance results (Nyquist plots) of FIG. 3 and FIG. 4. For those of Examples 1, 2, and 4, and Comparative Examples 1 and 3 (not shown) as well, the lithium ion conductivity was calculated in the same manner (see Table 1).

The results of Table 1, FIG. 3, and FIG. 4 revealed that the sintered bodies obtained by using the ceramic powders of Examples 1 to 4, which contained lanthanum oxide and had an $I_b/I_a$ value within a specific range (e.g., 0.02 or more and 0.2 or less), had a higher density, compared with the sintered bodies obtained by using the ceramic powders of Comparative Examples 1 and 2, which did not contain lanthanum oxide, or the sintered body obtained by using the ceramic powder of Comparative Example 3, which had an $I_b/I_a$ value outside the specific range. The results also revealed that the sintered bodies obtained by using the ceramic powders of Examples 1 to 4 had an ionic conductivity $\sigma_T$ more excellent than that of Comparative Examples 1 to 3.

Figure 5:
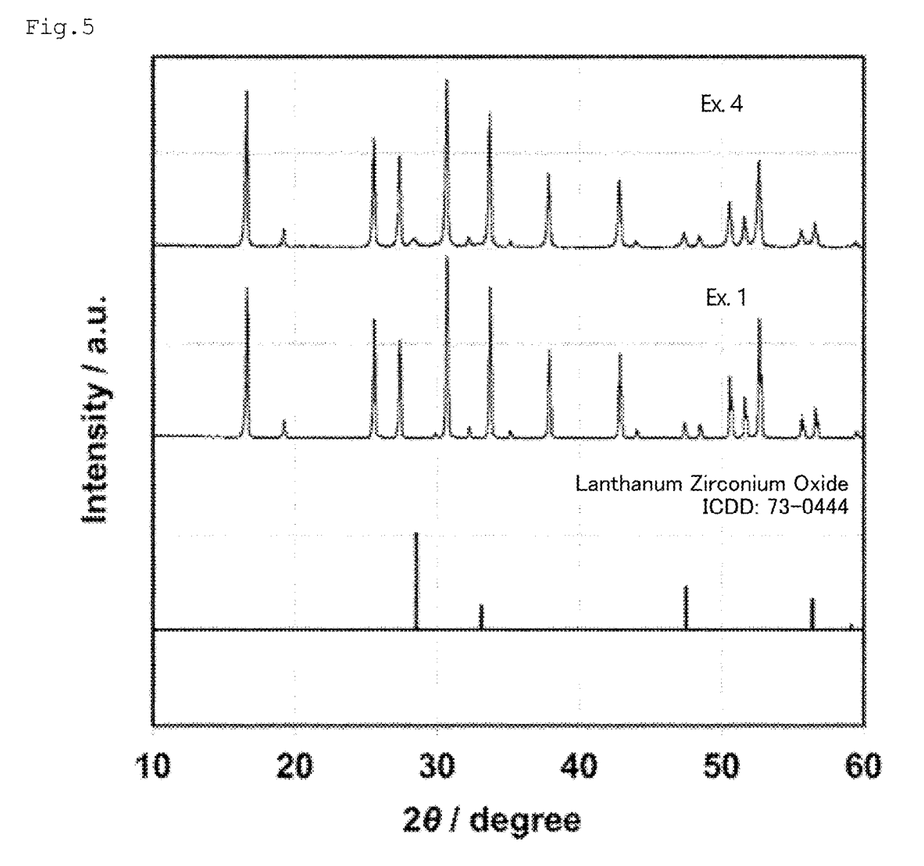
FIG. 5 shows the XRD measurement results of the ceramic powders produced in Examples 1 and 4.

In the XRD measurement results shown in FIG. 5, the ceramic powder of Example 1 showed diffraction peaks originating from a garnet-type oxide and lanthanum oxide.

In contrast, the ceramic powder of Example 4 showed a diffraction peak in the range of 2θ=28.3 to 28.7° originating from lanthanum zirconate, in addition to diffraction peaks originating from a garnet-type oxide and lanthanum oxide.

Figure 6:
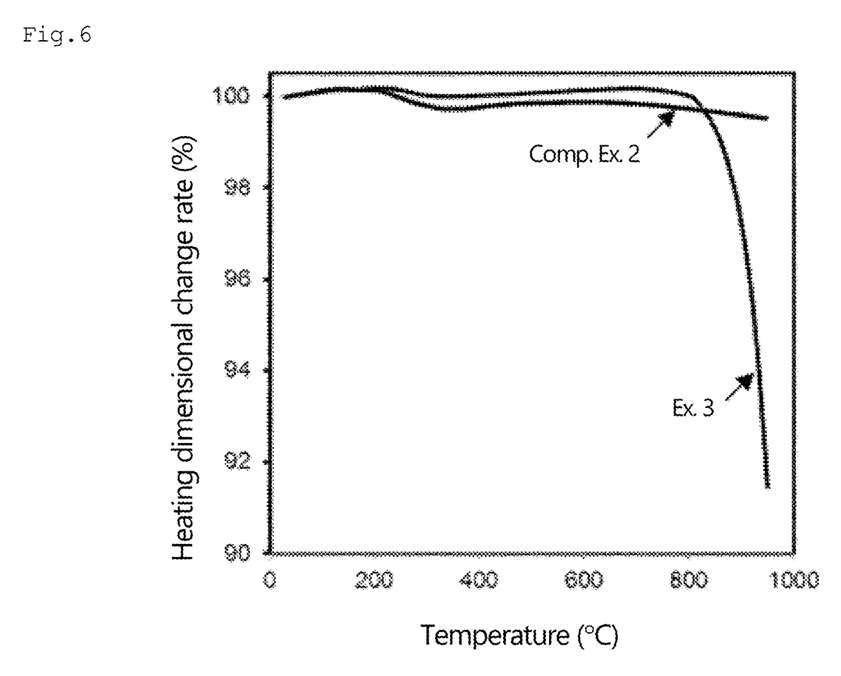
FIG. 6 shows the measurement results of the heating dimensional change rate of the molded bodies of the ceramic powders of Example 3 and Comparative Example 1.

FIG. 6 shows the measurement results of the heating dimensional change rate of each of the ceramic powders of Example 3 and Comparative Example 1. Table 2 summarizes the measurement results of the heating dimensional change rates.

TABLE 2

| Physical properties | Ex. 3 | Comp. Ex. 1 |
|---|---|---|
| $I_b/I_a$ | 0.071 | ND |
| Long-side dimension $L_0$ before heating /cm | 1.880 | 1.881 |
| Long-side dimension $L_1$ after heating /cm | 1.703 | 1.873 |
| $L_1 - L_0$ /cm | 0.177 | 0.008 |
| Heating dimensional change rate (%) | 9.4 | 0.4 |

Table 2 revealed that the ceramic powder of Example 3 containing lanthanum oxide had a higher value of heating dimensional change rate than that of the ceramic powder of Comparative Example 1 containing no lanthanum oxide. Further, as shown in FIG. 6, in Example 3, the dimensional shrinkage started from 800° C., which suggested that sintering of the ceramic powder of Example 3 would proceed at a temperature lower than that of the ceramic powder of Comparative Example 1.

The invention claimed is:

1. A ceramic powder, comprising:
   a garnet-type oxide comprising a compound represented by the formula $Li_{7-3x}Ga_xLa_3Zr_2O_{12}$, wherein $0.15 \leq x \leq 0.35$;
   lanthanum oxide; and
   lithium gallate,
   wherein a molar ratio of lanthanum to zirconium in the ceramic powder is 1.51 or more and 1.59 or less.

2. The ceramic powder according to claim 1, wherein the garnet-type oxide further contains at least one element selected from the group consisting of yttrium, cerium, calcium, barium, strontium, niobium, and tantalum.

3. The ceramic powder according to claim 1, further containing compound 2 containing lithium and having a melting point of 250° C. or higher and 1000° C. or lower.

4. The ceramic powder according to claim 1, further containing compound 3 containing lanthanum and zirconium and not containing lithium or gallium, wherein compound 3 is lanthanum zirconate.

5. The ceramic powder according to claim 1, wherein a value of $I_b/I_a$ of maximum peak intensity $I_b$ in the range of 2θ=29.7 to 30° to maximum peak intensity $I_a$ in the range of 2θ=16 to 17° is 0.02 or more and 0.2 or less in X-ray diffraction measurement.

6. The ceramic powder according to claim 1, wherein a value of the molar ratio Ga/Zr of gallium to zirconium is 0.075 or more and 0.18 or less.

7. The ceramic powder according to claim 1, wherein heat treatment of a molded body under conditions at a rate of 5° C./minute to 800° C. and then at a rate of 1° C./minute from 800 to 950° C. causes the molded body to start to undergo volumetric shrinkage at 800° C. or higher, and wherein the molded body after the heat treatment has a heating dimensional change rate of 5% or more.

8. The ceramic powder according to claim 1, wherein lithium lanthanum gallate is generated by heat treatment at 900° C. or higher.

* * * * *